United States Patent Office 3,042,538
Patented July 3, 1962

3,042,538
PLIABLE FILLER FOR MASK CUSHIONING MEANS
Norbert D. Thompson, Fort Myers, Fla., assignor to Galleher, Inc., Sarasota, Fla., a corporation of Ohio
No Drawing. Filed Sept. 22, 1959, Ser. No. 841,439
5 Claims. (Cl. 106—268)

This invention relates to a composition of matter and method and more particularly to a mixture having highly satisfactory characteristics for use as a filler in the construction of inhaler masks such, for instance, as are provided with a marginal cushioning cell at the rear of the mask for contact with the facial contours of the patient.

An object of the invention is a composition of matter employed as a filler material for use in marginal cushioning and sealing cells provided in inhaler mask constructions, which material possesses a degree of plasticity suitable for contouring the cell to the surfaces to which it is applied under relatively light pressure.

A further object of the invention is a simple mixture to be used as a mask cell filler which is characterized by its non-irritating properties, that is, that in use in a mask the mucous membranes of the eyes will not become irritated during or subsequent to the period the mask is in use on a patient's face.

Another object of the invention is a filler material of the type disclosed which is pliable at temperatures ranging from a high melting point of approximately 200° F. to approximately 32° F.

A still further object is a pliable, plastic filler composition which may be heated to convert it to the liquid state whereby a mask cell may easily be filled with the filler in the liquid state to the exclusion of air, thereby insuring against entrapped air cells in the filler such as would occur in a filler fed into a cell in the plastic or pliable state.

Another object and advantage of my improved filler composition is that it will not crystallize upon cooling from a liquid state into a pliable state.

Other objects and advantages will become apparent from the following description of the invention.

Anesthesia and inhaler masks of the type referred to, and particularly of the type disclosed in Patents Nos. 2,875,759 and 2,877,764, issued to Ellis A. Galleher, Jr., are provided with a marginal cushion which comprises a marginal cell and a filler material in the cell not only to provide a cushioning means between the face of the patient and the mask, but to provide means which will under relatively light pressure against the mask cause the cell to conform to the facial contours with which it comes into contact, thus effecting a sealing contact with the face and preventing escape of gas supplied to the patient through the mask.

In providing a filler material, it is, of course, necessary to insure certain desirable characteristics among which are: a material which will be compatible with the material of the mask or the filler cell; a material which will not irritate the mucous membranes of the eyes and which possesses properties, such as plasticity and which can be converted to a liquid state for easy filling of the mask cushion or cell, but which at normal temperatures is pliable.

I have made a filler material which was found after conclusive tests to have the above characteristics and properties. Such a material or composition, for best results, consists of a wax of the class including methylene-bisstearamide, and castor oil compounded in the ratio of approximately 1 part: 2 parts by weight, respectively. These ingredients may be thoroughly mixed in any suitable manner so that there is a uniform distribution of the components throughout the mass.

In the proportions indicated, the filler is possessed of a high degree of plasticity at ordinary room temperatures which is particularly desirable in applying the mask in use with its cushioning cell in contact with the face of the patient. In addition, such a filler is inert and is not only compatible with the rubber or latex material used in the mask and cell construction, but possesses a degree of elasticity which is also desirable in such uses.

More specifically, the filler composition disclosed herein is particularly suited to the use for which it is intended, in that it is normally a mass which is readily pliable at ordinary temperatures, thus enabling a mask having a marginal cell filled with the material to be applied to a patient's face under light pressure so that the surfaces of the cell contacting the facial contours under light pressure will readily conform to these contours in sealing relation therewith. Furthermore, the application of the mask in such use assures the highest degree of comfort to the patient.

The filler composition is characterized by a melting point of substantially 200° F. and this may readily be converted from its pliable state at normal temperatures to a liquid state by the application of heat. In the liquid state, the filler may easily be inserted in a mask marginal cell while air may be excluded therefrom. This eliminates the possible entrapment of air in the form of bubbles or voids in the mass within the cell. The filling of a cell with a filler in solid pliable form invites the inclusion of air cells, which is highly undesirable since the contouring of the marginal cell or cushion cannot be retained after pressure against the mask is released. By the use of my invention, the filler is first heated to render it liquid and then inserted into the mask marginal cell in the liquid state and allowed to cool to reconvert it to the plastic, or non-liquid state. Under such conditions, the cell is completely filled, is devoid of air cells or bubbles, and will retain a contour set resulting from pressing the mask with its marginal cell against the facial contours while the filler is in the pliable, plastic state. After such use, the mask with the same filler sealed in the marginal cell may be applied under slight pressure to other patients having different facial contours to be contacted by the mask cell.

As before, the application of slight pressure against the mask in position on a subsequent facial contour will cause the marginal cell to mate with the subsequent contour in sealing relation.

Thus, the same filler, once enclosed in the marginal cell in the liquid state and allowed to cool to the plastic or pliable state, may be used indefinitely as a means of contouring the marginal cushion on the mask to a great variety of facial contours, each of which will be retained until a subsequent contour is impressed on the cell by light pressure on the mask against the face of the patient.

What is claimed is:

1. A contour retaining filler for a cushioning cell of an inhaler mask consisting essentially of a mixture of methylene-bisstearamide and castor oil in the approximate ratio of 1:2 parts by weight.

2. A contour retaining filler for a cushioning cell of an inhaler mask consisting essentially of a mixture of methylene-bisstearamide and castor oil in substantially the ratio of 1:2 parts by weight, the component parts of the mixture being uniformly distributed throughout the mixture mass.

3. A contour retaining filler for a cushioning cell of an inhaler mask consisting essentially of an intimate mixture of methylene-bisstearamide and castor oil in substantially the ratio of 1:2 parts by weight, said mixture being characterized by having a liquid flowing consistency when heated to substantially 200° F. and having a pliable plastic consistency when cooled to ordinary room temperatures.

4. A contour retaining filler for a cushioning cell of an inhaler mask consisting essentially of an intimate mixture of methylene-bisstearamide and castor oil in substantially the ratio of 1:2 parts by weight, said mixture being characterized by having a liquid flowing consistency when heated to substantially 200° F. and having a pliable plastic consistency when cooled to ordinary room temperature, said material in the latter or cooled state being substantially non-crystalline.

5. A contour retaining filler for a cushioning cell of an inhaler mask consisting essentially of an intimate mixture of methylene-bisstearamide and castor oil in substantially the ratio of 1:2 parts by weight, said mixture being characterized by having a liquid flowing consistency when heated to substantially 200° F. and having a pliable plastic consistency when cooled to ordinary room temperature, said material in the latter or cooled state being substantially non-crystalline and non-irritating to the membranes of the human body.

References Cited in the file of this patent

UNITED STATES PATENTS

| | | |
|---|---|---|
| 1,808,090 | Vining | June 2, 1931 |
| 2,150,283 | MacRill | Mar. 14, 1939 |
| 2,261,229 | Cothran | Nov. 4, 1941 |
| 2,334,709 | Katzman | Nov. 23, 1943 |
| 2,439,207 | Feagin | Apr. 6, 1948 |
| 2,483,113 | Terivlliger | Sept. 27, 1949 |
| 2,875,759 | Galleher | Mar. 3, 1959 |
| 2,877,764 | Galleher | Mar. 17, 1959 |

OTHER REFERENCES

Albin H. Warth: Chemistry and Technology of Waxes, Reinhold, New York, 1956, page 485.

UNITED STATES PATENT OFFICE
CERTIFICATE OF CORRECTION

Patent No. 3,042,538

July 3, 1962

Norbert D. Thompson

It is hereby certified that error appears in the above numbered patent requiring correction and that the said Letters Patent should read as corrected below.

Column 1, line 58, after "cell;" insert -- a material which will have a desirable degree of elasticity; --.

Signed and sealed this 23rd day of October 1962.

(SEAL)
Attest:

ERNEST W. SWIDER
Attesting Officer

DAVID L. D
Commissioner of Patents